(12) United States Patent
Elder

(10) Patent No.: US 11,708,220 B2
(45) Date of Patent: Jul. 25, 2023

(54) HIGH-CAPACITY ELEVATOR CONVEYING SYSTEM

(71) Applicant: EMS-Tech Inc., Belleville (CA)

(72) Inventor: John Elder, Belleville (CA)

(73) Assignee: EMS-Tech Inc., Belleville (CA)

( * ) Notice: Subject to any disclaimer, the term of this patent is extended or adjusted under 35 U.S.C. 154(b) by 0 days.

(21) Appl. No.: 17/507,191

(22) Filed: Oct. 21, 2021

(65) Prior Publication Data

US 2023/0126348 A1    Apr. 27, 2023

(51) Int. Cl.
| | | |
|---|---|---|
| *B65G 15/14* | (2006.01) | |
| *B65G 39/12* | (2006.01) | |
| *B65G 15/60* | (2006.01) | |
| *B65G 47/44* | (2006.01) | |

(52) U.S. Cl.
CPC ............. *B65G 15/14* (2013.01); *B65G 15/60* (2013.01); *B65G 39/12* (2013.01); *B65G 47/44* (2013.01); *B65G 2201/042* (2013.01)

(58) Field of Classification Search
None
See application file for complete search history.

(56) References Cited

U.S. PATENT DOCUMENTS

| | | | | |
|---|---|---|---|---|
| 4,425,995 A | * | 1/1984 | Blattermann | B65G 15/14 |
| | | | | 198/605 |
| 4,776,450 A | * | 10/1988 | Schwing | B65G 15/16 |
| | | | | 198/626.2 |
| 5,996,769 A | * | 12/1999 | Winchip | B65G 15/16 |
| | | | | 198/607 |
| 9,139,368 B2 | * | 9/2015 | Viilo | B02C 21/02 |
| 9,815,627 B2 | * | 11/2017 | dos Santos | B65G 15/16 |

* cited by examiner

*Primary Examiner* — Kavel Singh
(74) *Attorney, Agent, or Firm* — Miltons IP/p.i.

(57) ABSTRACT

A low-profile, high-capacity elevator conveying system that is operably able to reduce spatial requirements for the elevating system to not less than about one third (⅓) of the overall lift height, and preferably having a height to base ratio in a range of between 4:1 to 8:1. The present invention also relates to a high capacity elevator conveying system which can elevate both fine and coarse materials through a range of between 300 μm and 300 mm, while limiting belt side travel to 150 mm maximum, or +/−75 mm as required to prevent edge damage to the conveyor belts.

20 Claims, 3 Drawing Sheets

SECTION A-A

HIGH-CAPACITY ELEVATOR CONVEYING SYSTEM

FIELD OF THE INVENTION

The present invention relates to a high-capacity sandwich type belt elevator conveying system having a compact profile that is operably able to reduce the spatial requirements for the elevating system to less than about one third (⅓) of the overall lift height. Ideally, the present invention aims to minimize the footprint of the elevator while maximizing lift, with the less than about ⅓ ratio as a minimum standard, and having a height to base length ratio in a range of between 4:1 to 8:1. The present invention also relates to a high capacity elevator conveying system which can elevate a full cross section of bulk materials ranging from the very fine at 300 μm through very course at 300 mm.

The present invention could also be configured and varied so as to: (1) elevate free-flowing dry powders, specifically alumina or aerated cement; (2) reduce belt side travel, and; (3) decrease dust generation within the same sandwich belt elevating system.

BACKGROUND OF THE INVENTION

Sandwich type belt elevator conveying systems for discharging bulk materials are known and have been used in the past. It is further known that sandwich type belt elevator conveying systems have been utilized wherever there is a need to elevate bulk material to later be discharged over a significant height differential, and wherein the space within which the elevator system can be located is restricted in size.

Previously, this need has been addressed with the supply of belt type, or chain type, bucket elevators, cleated type corrugated sidewall pocket belts, or 'C' type loop elevator conveying systems, where two conveyor belts come together at the bottom of the elevator and "sandwich" the material to be discharged between the belts, which then separate at the top to allow ultimate discharge of the trapped material.

However, there are problems with these conventional elevator conveying systems. Firstly, in the case of both bucket elevators and cleated corrugated sidewall belts, maintenance costs can be high and wet material becomes lodged, or trapped, in the buckets or pockets, and this trapped material can be difficult, if not impossible, to remove by conventional means. In the case of the 'C' type loop elevator, lift is restricted by the curve radius that is required to yield adequate radial pressure to sandwich, and retain, the material between the two belts.

Furthermore, with a conventional 'C' loop elevator conveying system, the spatial footprint required to lift and raise the material to be discharged is currently in the range of 30% to 50% of the lift height. As a means of example, if the material to be discharged is raised vertically 30 metres, such a system will require between 9 to 15 metres of horizontal space, wherever it is placed, for structure and equipment. This means that 9 to 15 metres of space is no longer available for storage of bulk materials.

In this regard, it would be beneficial to reduce the spatial footprint of an elevator belt conveying system. If such a system's footprint could be reduced to have a height to base length ratio of not less than about 3:1, or about 33% of an overall total lift height, this would equate to approximately a 17-25% reduction in spatial requirements, freeing up space for additional cargo. The current invention will allow users to both decrease the footprint and increase the lift of the elevator thereby minimizing spatial needs for the elevator, thus allowing this space to be utilized for other purposes, most notably storage of material or other machinery.

It would therefore be advantageous to provide an improved low-profile, high-capacity belt elevator conveying system that is operably able to reduce the spatial requirements for the elevating system to about one third (⅓) of the overall lift height, and which can convey and elevate materials a broad spectrum of materials ranging from the very fine, notably 300 μm, through very course, notably 300 mm.

It would also be advantageous to provide an improved low-profile, high-capacity belt elevator conveying system which can furthermore carry this broad spectrum of materials, but do so without the belts mis-tracking so as to run up against adjacent support structure or service platforms etc., which would otherwise result in significant belt edge damage.

To this end, the present invention effectively addresses these needs.

SUMMARY OF THE INVENTION

It is an object and advantage of the present invention to provide an improved low-profile, high-capacity sandwich type belt elevator conveying system.

It is a further object and advantage of the present invention to provide an improved low-profile, high-capacity sandwich type belt elevator conveying system that is operably able to reduce the spatial requirements for the elevating system to less than about one third (⅓) of the overall lift height, and which can convey and elevate a broad spectrum of materials. In the case of such an elevating system being used on a ship, for example, the system of the present invention will fit in a smaller footprint on the vessel, providing more cargo storage, while allowing for a wider range of materials to be conveyed.

It is yet a further object advantage of the present invention to provide an improved low-profile, high-capacity sandwich type belt elevator conveying system which can reduce an amount of belt travel of the inner belt and the outer belt from side to side when material is conveyed upwardly to not exceed 150 mm total from a center position of the inner belt and the outer belt, and within about ±75 mm on each side of the center position of the inner belt and the outer belt, which is equivalent to, or less than, conventional 'C' loop elevator systems.

According to one aspect of an embodiment of the present invention, there is provided a high-angle elevator conveying system comprising an outer belt for carrying material to be discharged, the outer belt comprising a carrying portion and a return portion rotating about at least two outer pulleys; an inner belt comprising a carrying portion and a return portion rotating about at least two inner pulleys, the inner belt and the outer belt being driven by at least one drive pulley, the material to be discharged being sandwiched between the outer belt and the inner belt; a first curved section for conveying the outer belt and the inner belt upwardly; at least one intermediate curved section having an opposite curve to that of the first curved section, which is connected to the first curved section for conveying the outer belt and the inner belt upwardly; and a second curved section substantially similar to the first curved section which is connected to the at least one intermediate section for conveying the outer belt and the inner belt upwardly, a distal end of the second curved section being in communication with a discharge chute for facilitating a discharge of the material.

According to another aspect of an embodiment of the present invention, there is provided a high-angle conveyor elevator conveying system comprising an outer belt for carrying material to be discharged, the outer belt comprising a carrying portion and a return portion rotating about at least two outer pulleys; an inner belt comprising a carrying portion and a return portion rotating about at least two inner pulleys, the inner belt and the outer belt being driven by at least one drive pulley, the material to be discharged being sandwiched between the outer belt and the inner belt; a first curved section for conveying the outer belt and the inner belt upwardly; at least one intermediate curved section having an opposite curve to that of the first curved section, which is connected to the first curved section for conveying the outer belt and the inner belt upwardly; and a second curved section substantially similar to the first curved section which is connected to the at least one intermediate section for conveying the outer belt and the inner belt upwardly, a distal end of the second curved section being in communication with a discharge chute for facilitating a discharge of the material; and wherein the system has a height to base length ratio of no less than about 3:1, or about 33% of an overall total lift height.

According to yet another aspect of an embodiment of the present invention, there is provided a method for manufacturing a high-angle conveyor elevator conveying system comprising the steps of providing an outer belt for carrying material to be discharged, and having a carrying portion and a return portion rotating about at least two outer pulleys provided for the outer belt; providing an inner belt comprising a carrying portion and a return portion rotating about at least two inner pulleys provided for the inner belt, whereby the material to be discharged is sandwiched between the outer belt and the inner belt; providing the inner belt and the outer belt to be driven by at least one drive pulley; providing a first curved section for conveying the outer belt and the inner belt upwardly; connecting at least one intermediate curved section to the first curved section, and having an opposite curve to that of the first curved section, for conveying the outer belt and the inner belt upwardly; connecting a second curved section substantially similar to the first curved section to the at least one intermediate section for conveying the outer belt and the inner belt upwardly; and engaging a distal end of the second curved section to be in communication with a discharge chute for facilitating a discharge of the material.

The present invention could also be configured and varied so as to: (1) elevate free-flowing dry powders, specifically alumina or aerated cement; (2) reduce belt side travel, and; (3) decrease dust generation within the same sandwich belt elevating system.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

Figure 1:
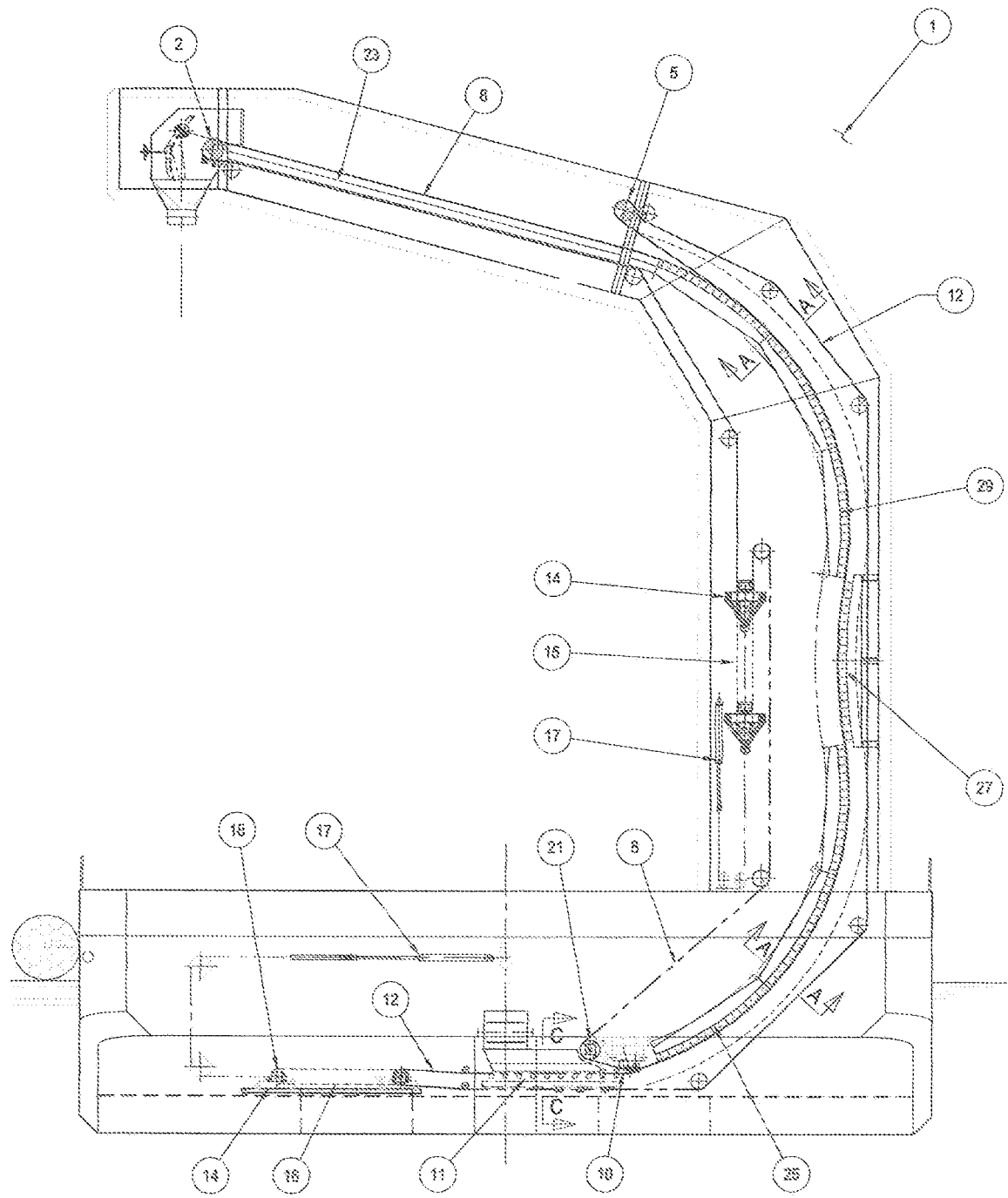
FIG. 1 is a side view of an exemplary embodiment of the high-capacity elevator conveying system of the present invention.

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention relates to a low-profile, high-capacity sandwich type belt elevator conveying system which could replace 'C' loop elevating systems of the type found on self-unloading ships, wherein bulk material is raised from below a ship's cargo hold to an above deck location where it is then either transferred to a shore side receiving facility or to a barge or other vessel. However, other applications of the present invention can be contemplated as listed below, for example, though other configurations are possible, as one skilled in the art would appreciate:

A transhipment platform wherein bulk material must be elevated from small shuttle vessels to large ocean going vessels and the platform is simply utilized as the method to move this material from one system to the other system, and there is limited or no material storage capacity available on the transhipment platform;

Material processing plants, wherein material is refined and processed and this refined material is then to be placed in tall storage bins or silos for eventual subsequent loadout into ships and/or rail cars or haulage trucks;

Bored tunnels for trains, roadways and the like, where ways and means are needed to elevate and remove the 'tunnel muck' generated by tunnel boring machines from the bore holes, through vertical shafts that are created for this purpose; and An open pit mine quarry, wherein the depth of the quarry can be very large and the movement of material to be discharged from base of quarry can be a huge and time-consuming task if surface mine haulage trucks are utilized. In such situations an elevator conveying system can be installed on one or more faces of the quarry wall thus allowing material to be elevated from the base of the quarry to the surface in an efficient manner, as quarry trucks can be expensive and quite inefficient, whereas elevator conveying systems are very efficient.

With respect to the high-capacity elevator conveying system 1 of the present invention being used for self-unloading ships, a ship's holds can first be expected to be opened via cargo discharge gates to allow the bulk materials therein to gravity fall through a gate system to a conveyor system arranged below the cargo hold. The elevator conveying system 1, as illustrated in FIGS. 1 and 2, typically placed either aft or forward of the cargo hold, then directs these bulk materials to a conveying belt on the boom, from which it is then discharged to a shore side receiving facility, to a barge, other vessel, shipping containers or transport vehicles.

Figure 2:
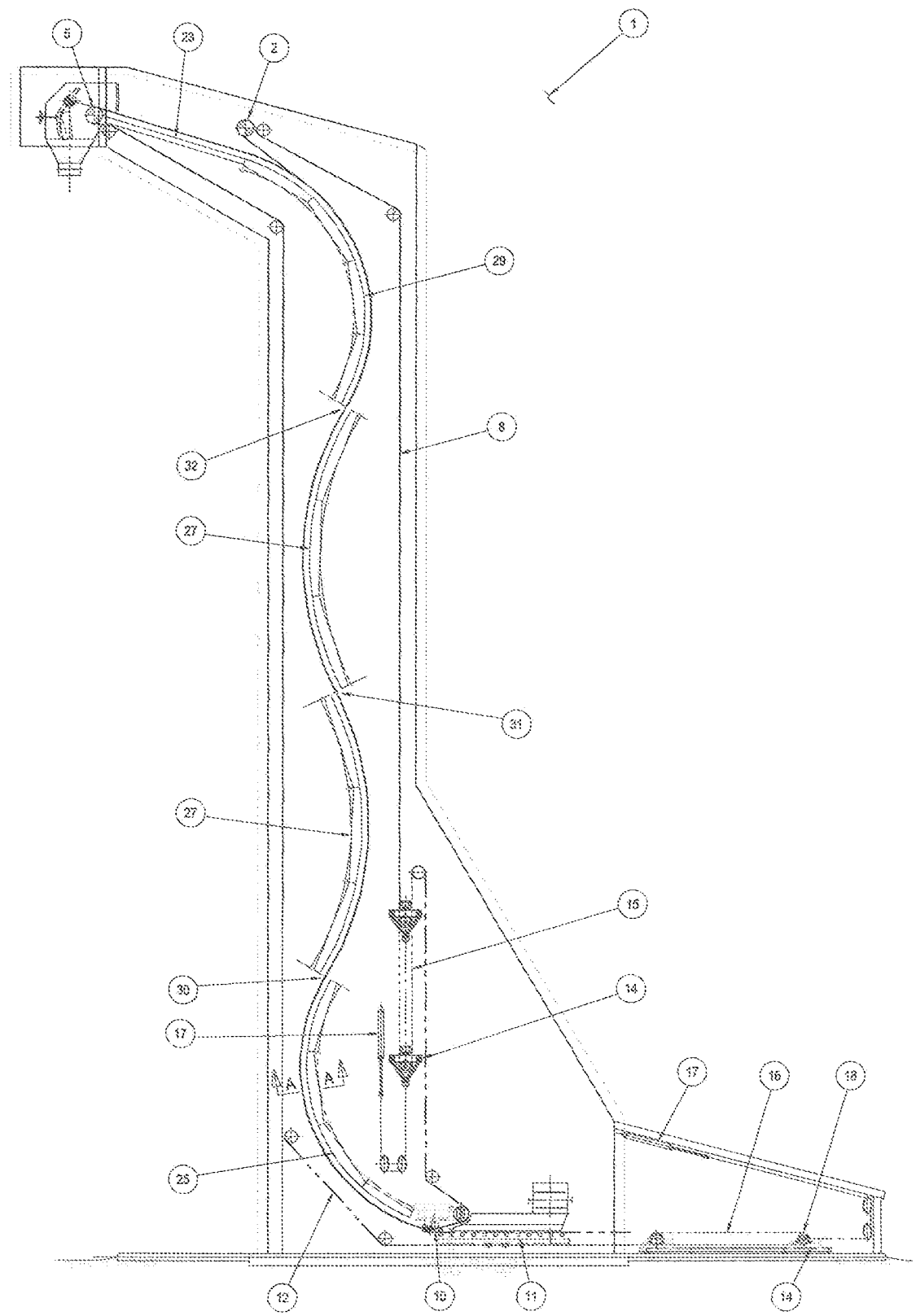
FIG. 2 side view of an exemplary embodiment of the high-capacity elevator conveying system of the present invention, in an alternate form showing the loading area, the discharge area, the first inwardly curved section, intermediate outwardly facing curved section, and subsequent curved sections, and the second curved section, the loading arrangement being on the opposite side of that illustrated in FIG. 1, while the discharge section is on the same side.
Figure 3:
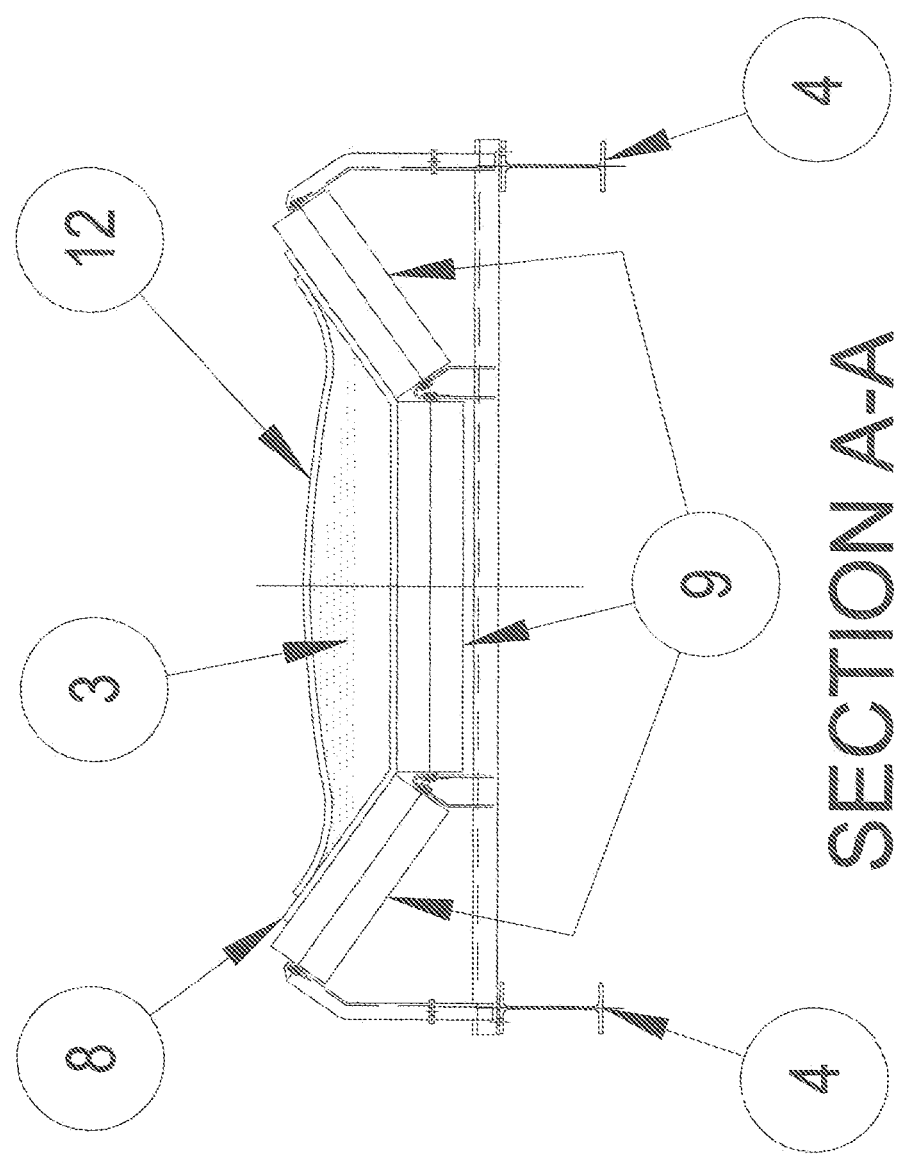
FIG. 3 is a cross sectional view of section 'A-A' of the high-capacity elevator conveying system shown in FIGS. 1 and 2.

In an exemplary embodiment, as shown in FIGS. 1 and 3, the elevator conveying system 1 of the present invention comprises two conveyor belts, which are an inner belt 8 and an outer belt 12 (as each shown in FIG. 3). Both the inner belt 8 and outer belt 12 are independent of one another, but in an exemplary embodiment run at the same speed, and run together, from the bottom of the elevator system to the top, and through the vertical curved sections of the elevator. Each of the inner belt 8 and outer belt 12 can be driven independently, or, in an alternative embodiment, one belt can be driven which in turn drives the other belt as a result of the two belts contacting one another. In the embodiment shown in FIG. 1, the inner belt 8 and outer belt 12 are, respectively, driven via Inner Loop Drive/Discharge Pulley 2 and Outer Loop Drive/Discharge Pulley 5. The inner belt 8 and outer belt 12 are supported by a series of related drive, discharge, tail, take-up and bend pulleys (not shown), as would be appreciated by one skilled in the art. The outer and inner belt drive pulleys are shown in FIG. 1 as, respectively, 5 and 2 above; Pulley 2 also serves as the discharge pulley; and the tail pulleys being shown as outer 18 and inner 21. In the case of FIG. 2, the inner belt 8 is powered by drive pulley 2, and the outer belt 12 is powered by drive pulley 5.

Material to ultimately be discharged is placed, or loaded, onto the outer belt 12 at the Outer loop loading section 11 at the base of the elevator system 1, as shown in FIG. 1. This material moves along the outer belt 12 into a loop throat section 10 where the inner belt 8 and outer belt 12 come together and sandwich the material to later be discharged through the lift, the belts ultimately separating at the top of the elevator system 1 to allow discharge of the trapped material.

With reference again to FIG. 3, this material 3 is sandwiched between the inner belt 8 and outer belt 12 by virtue of the radial pressure that is imposed on the material 3 by the outer belt 12, which is stretched over the material 3, and the inner belt 8 which rides on idler troughed roller assemblies 9 which are bolted on curved stringer frames 4, as well as the fact that the belts are pulled around curves, as hereinafter described. FIG. 3 illustrates a cross section "A-A' shown in FIGS. 1 and 2, of these elements. In a preferred embodiment, these idler troughed roller assemblies 9, are troughed outwardly in the lower and upper curve, while troughed inwardly, and outwardly, through the central lift portion of the elevator depending upon the number of curved sections employed through the lift section of the elevator.

Belt tension can also be applied and controlled by belt take-up systems (inner belt take up system being shown as 15 in FIG. 1, and outer belt take up system being shown as 16) located within both belt circuits. Belt tension, as would be appreciated by one skilled in the art, can also be applied utilizing either: (1) counterweights suspended from the frame that supports the take-up pulleys, or; (2) at least one pneumatic or hydraulic take up cylinder 17 that pulls on the take-up frame, or at least one take-up carriage 14, to yield the desired belt tension.

It should be noted that a conventional normal sandwich belt elevator, often referred to as a 'C' Loop elevator, or 'C' Belt elevator, comprises one inward facing curve of one or more different radii. Elevator lift with such conventional systems is very much limited by well defined minimum and maximum radii that can be applied. A too small radius can lead to overstress at the belt edges, while too large a radius will result in material spillage as radial pressures would be insufficient to contain the material between the two belts. With respect to the present invention, minimum and maximum radii are very much a function of belt width and belt tensions, but in an exemplary embodiment this could be said to be in a range of about 5 m through 30 m.

The present invention provides advantages in removing, or reducing substantially, lift limits, as intermediate, opposite facing curves can be introduced to allow the lift to be increased. As shown in FIGS. 1 and 2, a first curved section 25 is provided, which is connected and in engagement with at least one intermediate curved section 27. A second curved section 29 is also connected and in engagement with the intermediate curved section 27. In practice, if greater lift is required, or desired, a second curved/intermediate, or third curved/intermediate, section could also be introduced, as would be apparent to one skilled in the art. As can be appreciated, lift limit is ultimately defined by the strength limit, or capacity, of the belts that would be employed. In the example shown in FIG. 2, it should be noted that the arrangement of the curved sections is shown inverted to that illustrated in FIG. 1. That is to say that the loading section in FIG. 2, is shown to the right of the loop throat section 10, as opposed to the left, as shown in FIG. 1.

The inner belt 8 and outer belt 12 go through points of inflection when they pass from one curved to another. In the embodiment shown in FIG. 2, the belts go through at least three typical points of inflection noted as being 30, 31, 32. It is preferable that these transitions take place as quickly as possible to prevent migration of sandwiched material to the belt edges, which can lead to spillage and loss of material.

The inward and outward curve sections can be arranged, and sized, to cause the loading 11 and discharge 23 points to be aligned vertically over each other, if desired, or offset from each other such that the discharge point 23 is either forward, or aft, of the loading point. Preferably, the goal is to keep the transition of the material travelling between curved sections short and the edges tight, so as to minimize spillage and waste.

Further, in the interest of maximizing elevator capacity, it is recognized that pressure rolls or containment rolls (not shown) might be provided at the points off inflection to assist with maintaining material cross section form between the two belts, and ensuring material containment through these sections, as these pressure roll assemblies would assist to apply radial pressure needed to contain the materials on the belts rather than migrating to the belt edges. These articulated multi roll pressure roll assemblies would, preferably, be arranged on both outside faces of the belts where the belts go through the inflection points.

It should also be noted that the length of the loading section 11 that feeds the loop throat 10 can be extended to considerable length, wherein the loading section 11 may extend below the entire length of the cargo hold of a ship. Similarly, the discharge section 23 could be short, or it could be longer if necessary or desired (i.e. the discharge pulley 19 for the inner belt 8 could be just forward of the upper curve, or it could be far forward of the upper curve as illustrated in FIG. 1.

As noted previously, one of the main advantages of the present invention relates to the arrangement of the 'vertical' elevating curved sections of the elevator system wherein the multiple curve arrangement addresses a desire to increase elevator lift while not increasing the 'footprint' of the elevator. In a preferred embodiment, the system has a height to base length ratio of not less than about 3:1, or about 33% of an overall total lift height. Ideally, the preferred embodiment strives for a height to base length ratio in a range of between 4:1 to 8:1.

Moreover, by virtue of the arrangement of the 'vertical' elevating curved sections of the elevator system, an amount of belt travel of the inner belt and the outer belt from side to side when material is conveyed upwardly is not to exceed 150 mm total from a center position of the inner belt and the outer belt, and within about ±75 mm on each side of the center position of the inner belt and the outer belt, which is equivalent to or less than conventional 'C' loop elevator systems.

Other embodiments consistent with the present invention will become apparent from consideration of the specification and the practice of the invention disclosed therein. Accordingly, the specification and the embodiments are to be considered exemplary only, with the true scope and spirit of the invention being disclosed by the following claims.

I claim:

1. A high-angle elevator conveying system comprising:
    an outer belt for carrying material to be discharged, the outer belt comprising a carrying portion and a return portion rotating about at least two outer pulleys;
    an inner belt comprising a carrying portion and a return portion rotating about at least two inner pulleys, the inner belt and the outer belt being driven by at least one drive pulley, the material to be discharged being sandwiched between the outer belt and the inner belt;
    multiple vertical curved sections over which the outer belt and the inner belt travel upwardly in use, together with the sandwiched material, each vertical curved section comprising a shaped structural curved frame and multiple troughed roller assemblies on which the inner belt and the outer belt are supported;
    the multiple vertical curved sections comprising a first vertical curved section, at least one intermediate vertical curved section having an opposite curve to that of the first vertical curved section, and a second vertical curved section, the intermediate vertical curved section being connected to the first vertical curved section and the second vertical curved section being substantially similar to the first vertical curved section and is connected to the at least one intermediate vertical curved section, and a distal end of the second vertical curved section being in communication with a discharge chute for facilitating a discharge of the material.

2. The high-angle elevator conveying system of claim 1, wherein the inner belt and the outer belt are driven, respectively, by at least one inner belt drive pulley and at least one outer belt drive pulley.

3. The high-angle elevator conveying system of claim 1, wherein the inner belt is driven by the outer belt.

4. The high-angle elevator conveying system of claim 1, wherein the outer belt is driven by the inner belt.

5. The high-angle elevator conveying system of claim 1, wherein the material to be discharged is initially placed onto the outer belt at a loading section at the base of the conveyor system, then transferred via movement of the outer belt to a loop throat section where the inner belt and the outer belt come together for transferring the material to be discharged from the discharge chute.

6. The high-angle elevator conveying system of claim 1, wherein the inner belt and the outer belt run independently from one another.

7. The high-angle elevator conveying system of claim 1, wherein the inner belt and the outer belt run at a same speed.

8. The high-angle elevator conveying system of claim 1, wherein the system further comprises multiple vertical curved stringer frames, each vertical curved stringer frame being for engagement with one of the multiple vertical curved sections, and having troughed idler roll assemblies connected thereto for supporting the inner belt, the outer belt and the sandwiched material to be discharged as the outer belt and the inner belt are conveyed upwardly.

9. The high-angle elevator conveying system of claim 1, wherein an amount of belt travel of the inner belt and the outer belt from side to side when being conveyed upwardly does not exceed 150 mm total from a center position of the inner belt and the outer belt, and within about ±75 mm on each side of the center position of the inner belt and the outer belt.

10. The high-angle elevator conveying system of claim 1, wherein the system has a height to base length ratio of no less than about 3:1, or about 33% of an overall total lift height.

11. The high-angle elevator conveying system of claim 1, wherein the system has a height to base length ratio in a range of between 4:1 to 8:1.

12. The high-angle elevator conveying system of claim 1, wherein the system is operably able to elevate the material to be discharged in a range of very fine at about 300 µm through very course at about 300 mm.

13. A high-angle elevator conveying system comprising:
    an outer belt for carrying material to be discharged, the outer belt comprising a carrying portion and a return portion rotating about at least two outer pulleys;
    an inner belt comprising a carrying portion and a return portion rotating about at least two inner pulleys, the inner belt and the outer belt being driven by at least one drive pulley, the material to be discharged being sandwiched between the outer belt and the inner belt;
    multiple vertical curved sections over which the outer belt and the inner belt travel upwardly in use, together with the sandwiched material, each vertical curved section comprising a shaped structural curved frame and multiple troughed roller assemblies on which the inner belt and the outer belt are supported;
    the multiple vertical curved sections comprising a first vertical curved section, at least one intermediate vertical curved section having an opposite curve to that of the first vertical curved section, and a second vertical curved section, the intermediate vertical curved section being connected to the first vertical curved section and the second vertical curved section being substantially similar to the first vertical curved section and is connected to the at least one intermediate vertical curved section, and a distal end of the second vertical curved section being in communication with a discharge chute for facilitating a discharge of the material; and
    wherein the system has a height to base length ratio of no less than about 3:1, or about 33% of an overall total lift height.

14. The high-angle elevator conveying system of claim 13, wherein the system has a height to base length ratio in a range of between 4:1 to 8:1.

15. The high-angle elevator conveying system of claim 13, wherein the system is operably able to elevate the material to be discharged in a range of very fine at about 300 µm through very course at about 300 mm.

16. A method for manufacturing a high-angle elevator conveying system comprising the steps of:

providing an outer belt for carrying material to be discharged, and having a carrying portion and a return portion rotating about at least two outer pulleys provided for the outer belt;

providing an inner belt comprising a carrying portion and a return portion rotating about at least two inner pulleys provided for the inner belt, whereby the material to be discharged is sandwiched between the outer belt and the inner belt;

providing the inner belt and the outer belt to be driven by at least one drive pulley;

providing a first vertical curved section over which the outer belt and the inner belt, together with the sandwiched material, will travel upwardly;

connecting at least one intermediate vertical curved section to the first curved section, and having an opposite curve to that of the first vertical curved section, for conveying the outer belt and the inner belt, together with the sandwiched material, upwardly;

connecting a second vertical curved section to the at least one intermediate vertical curved section which is substantially similar to the first vertical curved section for conveying the outer belt and the inner belt, together with the sandwiched material, upwardly; and engaging a distal end of the second vertical curved section to be in communication with a discharge chute for facilitating a discharge of the material, wherein each of the first vertical curved section, the at least one vertical curved section and the second vertical curved section comprises a shaped structural curved frame and multiple troughed roller assemblies on which the inner belt and the outer belt are supported.

17. The method of claim 16, further comprising the steps of:

providing curved stringer frames for engagement with each of the first vertical curved section, the at least one intermediate vertical curved section, and the second vertical curved section; and providing troughed idler roll assemblies for connection to the curved stringer frames for supporting the inner belt, the outer belt and the sandwiched material to be discharged as the outer belt and the inner belt are conveyed upwardly.

18. The method of claim 16, further comprising the step of adjusting the inner belt and the outer belt so that an amount of belt travel of the inner belt and the outer belt from side to side when the material is conveyed upwardly is not to exceed 150 mm total from a center position of the inner belt and the outer belt, and within about ±75 mm on each side of the center position of the inner belt and the outer belt.

19. The method of claim 16, further comprising the step of providing the system to have a height to base length ratio of no less than about 3:1, or about 33% of an overall total lift height.

20. The method of claim 16, further comprising the step of providing the system to have a height to base length in a range of between 4:1 to 8:1.

\* \* \* \* \*